July 1, 1930. P. L. STENMAN 1,768,801
APPARATUS FOR THE MANUFACTURE OF SCREWS
Filed Dec. 8, 1925 2 Sheets-Sheet 1
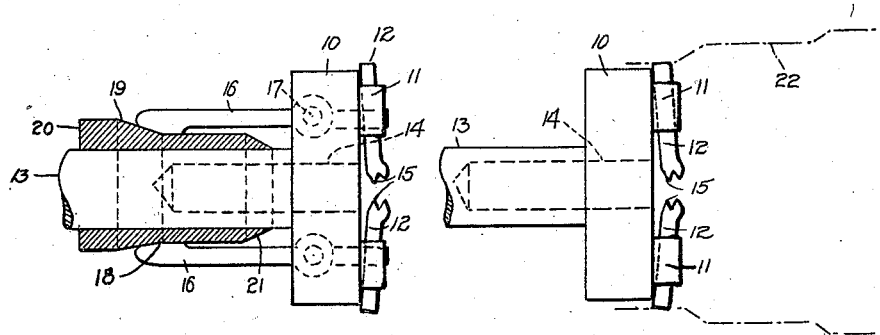
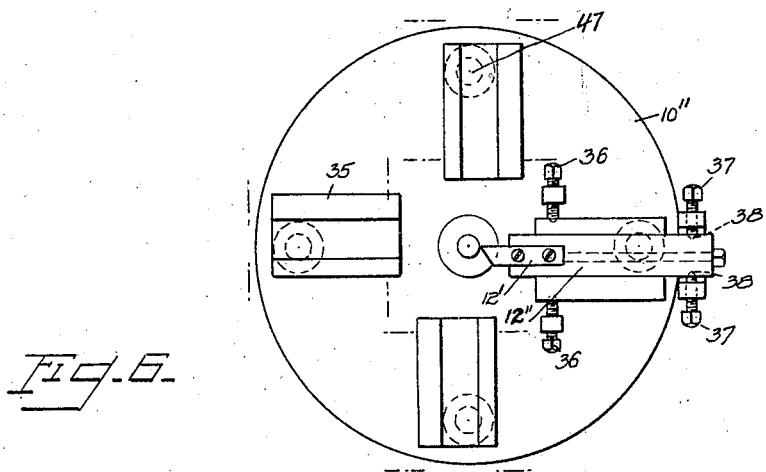
Per Leonard Stenman
INVENTOR
BY
his ATTORNEY.

July 1, 1930.  P. L. STENMAN  1,768,801
APPARATUS FOR THE MANUFACTURE OF SCREWS
Filed Dec. 8, 1925   2 Sheets-Sheet 2
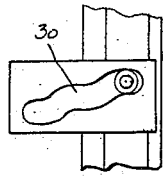
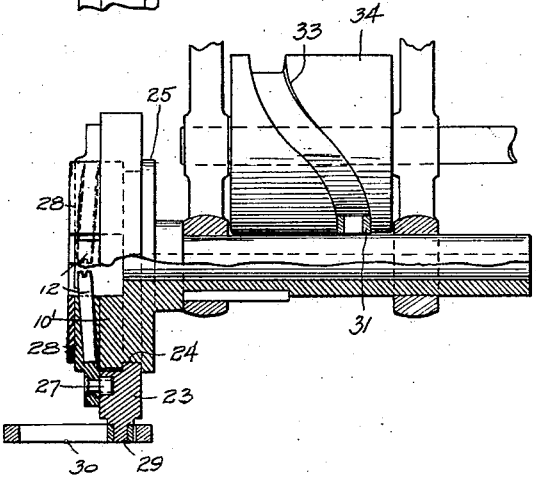
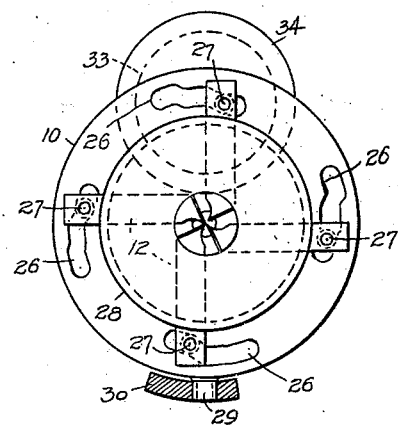
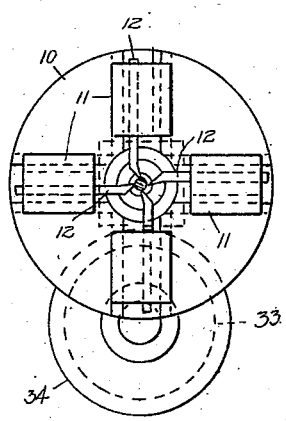
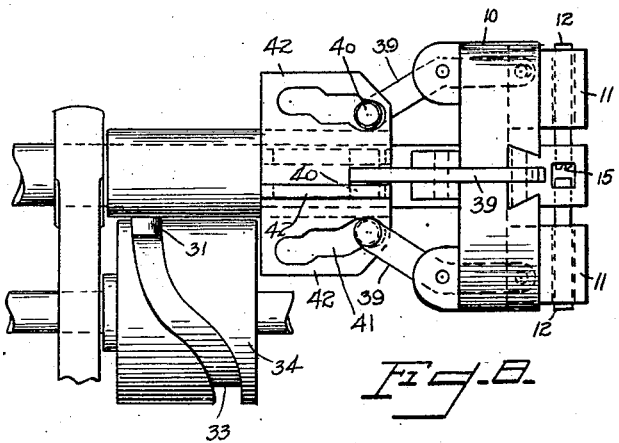
Per Leonard Stenman
INVENTOR
BY
his ATTORNEY.

Patented July 1, 1930

1,768,801

UNITED STATES PATENT OFFICE

PER LEONARD STENMAN, OF STOCKHOLM, SWEDEN

APPARATUS FOR THE MANUFACTURE OF SCREWS

Application filed December 8, 1925. Serial No. 74,120.

My invention relates to the manufacture of screws, and has particular reference to an improved apparatus comprising a plurality of cutting tools.

The subject matter disclosed by the accompanying drawing except that illustrated by Figures 5 to 8 inclusive is taken from my copending application, Serial No. 667,818, filed October 11, 1923.

An object of the invention is to provide means for cutting threads upon screw blanks in the course of a single operation, whereby the capacity of the machines will be increased and the cost of manufacture correspondingly reduced.

As set forth more fully in the said copending application, I achieve this object by providing a plurality of cutting tools, each one of which may have one or more cutting edges, and means for causing relative movement of the tools and the screw blank so that the tools will follow each other in succession through the initial cut made by the first tool, thereby completing the entire threading operation during only one movement of the tools across the screw blank.

In the prior application a plurality of cutting tools was referred to generally, and in this application, I purpose to describe and claim various modifications embodying a plurality of cutting tools in radial disposition relative to the blank.

In the accompanying drawings wherein I have illustrated by way of example several constructions which will disclose the nature of my invention, Fig. 1 is a side view, partly in section, of one form of construction;

Fig. 2 is a view similar to Fig. 1, showing a slight modification, and with parts omitted for the sake of clearness;

Figs. 3 and 4 are side and end views respectively, partly in section, illustrating another form of construction;

Fig. 5 is a plan view of a portion of Fig. 3;

Fig. 6 is an end view of another form of construction; and

Figs. 7 and 8 are end and side view respectively of a similar form of construction.

Referring to the drawings, and particularly to Figs. 1 and 2, I have shown a tool carrier 10 having radially disposed guide ways 11 on one face thereof and tools 12 disposed in said guide ways with their cutting edges toward the center. The carrier 10 may be substantially circular in shape, and has a rearwardly projecting shaft portion 13 suitably mounted for axial movement thereof in bearings, not shown. The carrier is provided with an axial bore or opening 14 with its open end adjacent the cutting edges with the tools, whereby axial movement of the carrier 10 with respect to a screw blank (not shown), suitably mounted for rotation in a chuck (not shown), will allow the tools to move longitudinally along the blank, the opening 14 receiving the blank during such movement.

The tools are provided with one or more cutting edges 15 which are disposed along a helix, and successive tools from one end of this helix to the other are arranged in their guide ways 11 in positions at increasing distances from the axis of the blank. In other words the cutting edges are arranged along a conical spiral whereby longitudinal movement of the tools along the blank in timed relation to the rotation of the blank will cause the tools to cut successively through a helical cut made by the first tool, each succeeding tool cutting a little deeper so that one motion of the tools along the blank will cut a complete screw thread on the blank.

For the purpose of pointing the end of the screw, and for withdrawing the tools from the blank at the inner end of the thread, and for a similar purpose of shaping the periphery of the screw in any desired manner (as for example in the case of wood screws as compared with machine screws), means are provided for moving the tools radially in their guide ways at predetermined intervals. Thus in Fig. 1, I have shown the tools articulated to levers 16 which are pivoted at 17 to the tool carrier and whose rear ends are suitably curved and shaped as at 18 to be guided by a cam surface 19 on a fixed sleeve 20. In Fig. 1 the tools are shown in a position about midway of their travel along a screw blank. The continuation of the axial movement of the carrier 10 (to the right in Fig. 1) will cause the ends 18 eventually to engage and follow the innermost end 21 of the cam surface 19, whereby the tools 12 will be moved in an outward radial direction withdrawing them from the blank.

In Fig. 2 I have shown diagrammatically how a construction substantially similar to that shown in Fig. 1 may embody cam surfaces 22 engaged directly by the rear ends of the tools 12, whereby the necessity for a sleeve 20 and levers 16 is eliminated.

In Fig. 3 I have shown a construction in which a sleeve 23 is carried by the carrier 10' rotatably with respect thereto by virtue of an internal flange 24 of the sleeve 23 engaging in an annular groove 25 in the carrier 10'. The front surface of the sleeve 23 is provided with suitably curved or cam grooves 26, and the rear portions of the tools are provided with pins or pivots 27 movable in and guided by the grooves 26. Suitable radial guide ways 28 are again provided on the front face of the carrier 10' to receive the tools. At one point in the periphery of the sleeve 23, the latter is provided with a pin or pivot 29 movable in and guided by a fixed cam slot 30. Means are again provided for causing axial movement of the carrier in timed relation to the rotation of the screw blank (not shown), and I have illustratively shown a pin or pivot 31 carried by a rearwardly projecting shaft portion 32 of the carrier and engaging a cam track 33 in a barrel cam 34 rotated at a suitable speed with respect to the rotation of the screw blank.

Axial movement of the carrier by means of the rotation of the cam 34 will cause the sleeve 23 to be rotated slightly at predetermined intervals by virtue of the engagement of the pin 29 in the cam slot 30. Such rotation of the sleeve relative to the carrier will cause the tools to move in radial directions by virtue of the engagements of the pins 27 in the cam grooves 26 for the purposes hereinbefore set forth.

In the arrangement illustrated in Figure 6, the tool guides 35 are attached to the tool holder $10^{11}$ by pivotal connections 47. A tool $12^1$ is illustrated mounted adjustably on a tool bar $12^{11}$ which is adapted to slide in the slot or groove 49 of the tool guide 35. Advance of the tool towards the work piece 50, or its retraction from said work piece is effected through the agency of the lever 42 operating substantially as described with reference to Figure 1 of the drawing and it will be clear that the end of the said lever corresponding to outer arm of the lever 16 in Figure 1, is, in this case forked and provided with adjustable screws 37 having conical points pivotally engaging conical recesses 38 in the tool bar $12^{11}$.

Adjustable screws 36, having threaded engagement with lugs 53 protruding from the face of the tool holder guide 35 and by their means the said guide may be adjusted to attack the work either in a radial direction or in a plane not containing the longitudinal axis of the blank.

The adjustable pivotal connection provided by the screws 37 and recesses 38 permits of any requisite relative movement between the tool bar $12^{11}$ and lever $42^{11}$.

Figs. 7 and 8 show a construction similar to that illustrated in Fig. 1 in which levers 39 are engaged at their ear ends $40^{11}$ by cam slots $41^{11}$ provided in a fixed sleeve $42^{11}$.

It will be obvious that various modifications in the details as herein described and illustrated in order to explain the nature of my invention may be made without departing from the spirit and scope of my invention as set forth in the appended claims.

I claim:

1. In a machine for cutting threads in a rotating screw blank, the combination of a plurality of cutting tools disposed radially of the axis of said blank and having cutting edges disposed along a conical spiral about the axis of said blank and means for simultaneously moving said cutting edges radially of said blank.

2. In a machine for cutting threads in a rotating screw blank, the combination of a plurality of cutting tools disposed radially of the axis of the said blank and having similar cutting edges disposed along a conical spiral about the axis of said blank and means for simultaneously moving said cutting edges radially of said blank at different speeds.

3. In a machine for cutting threads in a rotating screw blank, the combination of a plurality of cutting tools disposed radially of the axis of said blank and having similar cutting edges disposed along a conical spiral about the axis of said blank and means for simultaneously moving said cutting edges radially of said blank at different speeds, said means comprising a plurality of differently shaped cam tracks and means on said tools co-operating with said cam tracks.

4. In a machine for cutting threads in a screw blank the combination of a plurality of cutting tools disposed radially of the axis of said blank and having similar cutting edges disposed along a conical spiral about the axis of said blank, means for moving said tools as a unit longitudinally of said blank, and means for simultaneously moving the cutting edges of said tools radially of said blank during said longitudinal movement of said tools.

5. In a machine for cutting threads in a rotating screw blank the combination of a plurality of cutting tools disposed radially of the axis of said blank and having similar cutting edges disposed along a conical spiral about the axis of said blank, means for moving said tools as a unit longitudinally of said blank, and means for simultaneously moving the cutting edges of said tools at different speeds radially of said blank during said longitudinal movement of said tools.

6. In a machine for cutting threads in a rotating screw blank the combination of a plurality of cutting tools disposed radially of the axis of said blank and having similar cutting edges disposed along a conical spiral about the axis of said blank, means for moving said tools as a unit longitudinally of said blank, and means for simultaneously moving the cutting edges of said tools at different speeds radially of said blank during said longitudinal movement of said tools, said means comprising a plurality of differently shaped cam tracks and means on said tools co-operating with said cam tracks.

7. In a machine for cutting threads in a screw blank, in combination, a tool head, means for moving said tool head longitudinally of said blank in timed relation to said rotation, a plurality of cutting tools disposed in said tool head substantially radially of said blank, and means for moving said tools substantially radially of said blank at different speeds during the cutting operation, whereby the pointed end and the shank of the screw are formed in a continuous operation.

In testimony whereof I affix my signature.

PER LEONARD STENMAN.